US012711637B2

(12) United States Patent
Guo et al.

(10) Patent No.: US 12,711,637 B2
(45) Date of Patent: Aug. 18, 2026

(54) TARGET TRACKING METHOD, APPARATUS, DEVICE AND MEDIUM

(71) Applicant: Beijing Zitiao Network Technology Co., Ltd., Beijing (CN)

(72) Inventors: Hengkai Guo, Beijing (CN); Sicong Du, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 383 days.

(21) Appl. No.: 18/550,925

(22) PCT Filed: Mar. 11, 2022

(86) PCT No.: PCT/CN2022/080468

§ 371 (c)(1),
(2) Date: Sep. 15, 2023

(87) PCT Pub. No.: WO2022/194061

PCT Pub. Date: Sep. 22, 2022

(65) Prior Publication Data

US 2024/0153110 A1 May 9, 2024

(30) Foreign Application Priority Data

Mar. 15, 2021 (CN) ......................... 202110276357.2

(51) Int. Cl.
*G06T 7/246* (2017.01)

(52) U.S. Cl.
CPC .... *G06T 7/248* (2017.01); *G06T 2207/10016* (2013.01)

(58) Field of Classification Search
None
See application file for complete search history.

(56) References Cited

U.S. PATENT DOCUMENTS 10,297,026 B1 5/2019 Jordan et al.
12,482,111 B2 * 11/2025 Adeel .................... G06T 7/246

(Continued)

FOREIGN PATENT DOCUMENTS

CN 102087747 A 6/2011
CN 104599286 A 5/2015

(Continued)

OTHER PUBLICATIONS

ISA China National Intellectual Property Administration, International Search Report and Written Opinion Issued in Application No. PCT/CN2022/080468, May 23, 2022, WIPO, 13 pages.

(Continued)

*Primary Examiner* — Randolph I Chu
(74) *Attorney, Agent, or Firm* — Alleman Hall LLP

(57) ABSTRACT

The present disclosure relates to a target tracking method, apparatus, device and a medium. The target tracking method includes: acquiring a target video, where the target video includes a first image frame and a first subsequent image frame sequence after and adjacent to the first image frame; performing polygon detection on the first image frame to obtain each vertex of a target polygon; and tracking each vertex of the target polygon in the first subsequent image frame sequence according to a first vertex position of each vertex of the target polygon in the first image frame. According to embodiments of the present disclosure, real-time performance and accuracy of tracking the target polygon can be improved.

18 Claims, 5 Drawing Sheets

(56) References Cited

U.S. PATENT DOCUMENTS

| | | | | |
|---|---|---|---|---|
| 2001/0025298 | A1* | 9/2001 | Masukura | G06T 7/20 709/250 |
| 2015/0036937 | A1 | 2/2015 | Kim et al. | |
| 2017/0344855 | A1* | 11/2017 | Mande | G06V 20/58 |
| 2020/0226781 | A1* | 7/2020 | Ma | G06T 7/33 |
| 2022/0183208 | A1* | 6/2022 | Sibley | A01B 69/001 |
| 2024/0153110 | A1* | 5/2024 | Guo | G06T 7/248 |
| 2024/0161318 | A1* | 5/2024 | Creswell | G06T 7/246 |
| 2025/0342664 | A1* | 11/2025 | Fu | G06F 3/01 |

FOREIGN PATENT DOCUMENTS

| | | | |
|---|---|---|---|
| CN | 105957114 | A | 9/2016 |
| CN | 109448045 | A | 3/2019 |
| CN | 109461174 | A | 3/2019 |
| CN | 109472814 | A | 3/2019 |
| CN | 109753940 | A | 5/2019 |
| CN | 110060276 | A | 7/2019 |
| CN | 110516620 | A | 11/2019 |
| CN | 112258556 | A | 1/2021 |
| WO | 2020211624 | A1 | 10/2020 |

OTHER PUBLICATIONS

China National Intellectual Property Administration, First Office Action for Chinese Application No. 202110276357.2, mailed on Dec. 16, 2024, 20 pages.

Yang., et al., "Traffic Target Detection and Tracking Based on Wavelet Lifting Framework," Traffic Information and Safety 0.5 , Oct. 20, 2011, 5 pages.

China National Intellectual Property Administration, Office Action and Search Report Issued in Application No. 202110276357.2, Jul. 2, 2025, 21 pages.

* cited by examiner

TARGET TRACKING METHOD, APPARATUS, DEVICE AND MEDIUM

CROSS-REFERENCE TO RELATED APPLICATIONS

This application is a National Stage of International Application No. PCT/CN2022/080468, filed on Mar. 11, 2022, which claims priority to Chinese Patent Application No. 202110276357.2, filed on Mar. 15, 2021 and entitled "TARGET TRACKING METHOD, APPARATUS, DEVICE AND MEDIUM". Both of the above applications are hereby incorporated by reference in their entireties.

TECHNICAL FIELD

Embodiments of the present disclosure relate to the technical field of multimedia technologies, and in particular to a target tracking method, apparatus, device and medium.

BACKGROUND

Target tracking, a technology for locating a target object in a video, requires first determining a target object to be tracked in the video, and then determining a position of the target object to be tracked in each frame of the video in subsequent video.

In the prior art, target tracking is generally realized by tracking the entire target object in each frame of the video, resulting in a lot of calculation required for the tracking process, which reduces real-time performance of tracking the target object.

SUMMARY

In order to solve or at least partially solve the above technical problems, the present disclosure provides a target tracking method, apparatus, device and medium.

In a first aspect, the present disclosure provides a target tracking method, including:

- acquiring a target video, where the target video includes a first image frame and a first subsequent image frame sequence after and adjacent to the first image frame;
- performing polygon detection on the first image frame to obtain each vertex of a target polygon; and
- tracking each vertex of the target polygon in the first subsequent image frame sequence according to a first vertex position of each vertex of the target polygon in the first image frame.

In a second aspect, the present disclosure provides a target tracking apparatus, including:

- a first acquisition unit, configured to acquire a target video, where the target video includes a first image frame and a first subsequent image frame sequence after and adjacent to the first image frame;
- a first detection unit, configured to perform polygon detection on the first image frame to obtain each vertex of a target polygon; and
- a first tracking unit, configured to track each vertex of the target polygon in the first subsequent image frame sequence according to a first vertex position of each vertex of the target polygon in the first image frame.

In a third aspect, the present disclosure provides a target tracking device, including:

- a processor; and
- a memory, configured to store executable instructions;
- where the processor is configured to read the executable instructions from the memory and execute the executable instructions to implement the target tracking method according to the first aspect.

In a fourth aspect, the present disclosure provides a computer-readable storage medium, where the computer-readable storage medium stores a computer program, and when a processor executes the computer program, the target tracking method according to the first aspect is implemented.

In a fifth aspect, the present disclosure provides a computer program product, including a computer program stored in a readable storage medium, where at least one processor of an electronic device can read the computer program from the readable storage medium, and the at least one processor executes the computer program, so that the electronic device performs the target tracking method according to the first aspect.

In a sixth aspect, the present disclosure also provides a computer program, stored in a readable storage medium, where at least one processor of an electronic device can read the computer program from the readable storage medium, and the at least one processor executes the computer program, so that the electronic device performs the target tracking method according to the first aspect.

Compared with the prior art, the technical solution provided by the embodiments of the present disclosure has at least the following advantages:

- the target tracking method, apparatus, device, storage medium, computer program product and computer program of the embodiments of the present disclosure, on one hand, can first detect each vertex of a target polygon to be detected in a first image frame of a target video, and then track each vertex of the target polygon to be detected in a first subsequent image frame sequence after the first image frame, and thus the target polygon to be detected can be tracked only by tracking the vertices of the target polygon, so that only a small amount of calculation is required for a tracking process, which improves real-time performance of tracking the target polygon; and on the other hand, can also track the target in a continuous video frame sequence, which improves accuracy of tracking the target polygon.

BRIEF DESCRIPTION OF DRAWINGS

The above and other features, advantages and aspects of embodiments of the present disclosure will become more apparent in conjunction with drawings, and by referring to the following specific implementations. Throughout the drawings, identical or similar reference characters indicate identical or similar elements. It should be understood that the drawings are schematic, and the components and elements are not necessarily drawn to scale.

DESCRIPTION OF EMBODIMENTS

Figure 1:
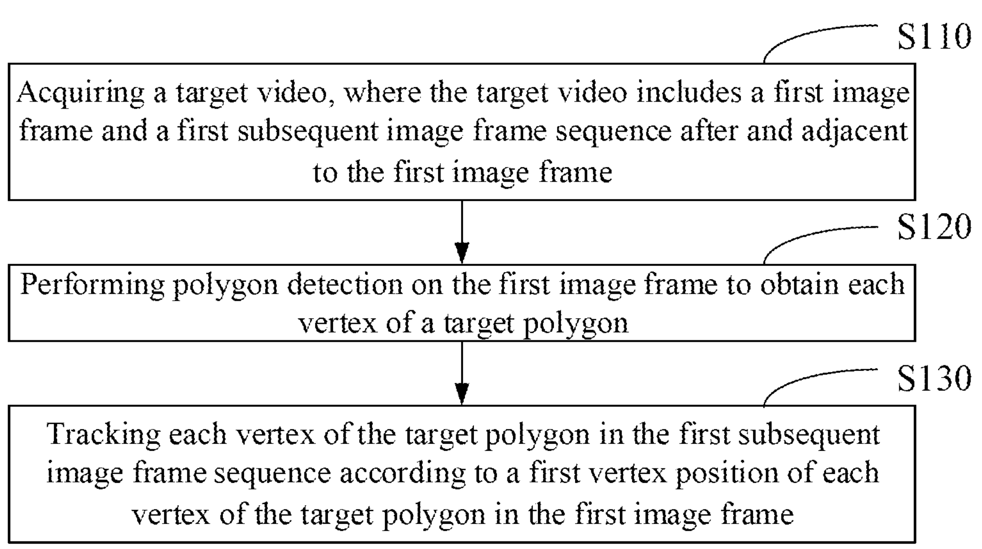
FIG. 1 is a schematic flowchart of a target tracking method provided by an embodiment of the present disclosure.

Embodiments of the present disclosure will be described in greater detail below with reference to the drawings. Although some embodiments of the present disclosure are shown in the drawings, it should be understood, however, that the present disclosure may be implemented in various forms and should not be construed as limited to the embodiments set forth herein, but rather, these embodiments are provided for a more thorough and complete understanding of the present disclosure. It should be understood that the drawings and embodiments of the present disclosure are for illustrative purposes only and are not intended to limit the scope of protection of the present disclosure.

It should be understood that steps described in the method implementations of the present disclosure can be executed in different orders and/or in parallel. In addition, the method implementations may include additional steps and/or omit the shown steps. The scope of the present disclosure is not limited in this respect.

As used herein, the term "include" and its variations are open-ended inclusion, i.e., "including but not limited to". The term "based on" means "based at least in part". The term "one embodiment" means "at least one embodiment"; the term "another embodiment" means "at least one other embodiment"; and the term "some embodiments" means "at least some embodiments". Relevant definitions of other terms will be given in the following description.

Note that the concepts "first", "second", etc., mentioned in The present disclosure are used only to distinguish between different devices, modules or units, and are not intended to limit the order or interdependence of the functions performed by these devices, modules or units.

It should be noted that the modifications of "one" and "more than one" mentioned in The present disclosure are illustrative but not restrictive, and it should be understood by those skilled in the art that, they should be understood as "one or more" unless otherwise clearly indicated in the context.

The names of messages or information interchanged between a plurality of apparatus in the embodiments of the present disclosure are for illustrative purposes only and are not intended to limit the scope of those messages or information.

Embodiments of the present disclosure provide a target tracking method, apparatus, device and medium capable of a tracking polygon through vertices.

The target tracking method provided by the present disclosure may be applied to various scenarios where an object polygon in a video needs to be tracked. For example, the target tracking method can be applied to a scenario where a specified image is added to a target polygon in a target video. For another example, the target tracking method can also be applied to a scenario where image content within a target polygon in a target video is automatically acquired. For another example, the target tracking method can also be applied to a scenario where an image frame having a target polygon in the target video is automatically acquired. The present disclosure does not limit the application scenarios of the target tracking method.

The following is an example of adding a specified image to a target polygon in a target video by an electronic device for a detailed explanation.

In the process of adding the specified image to the target polygon in the target video, the electronic device first needs to track the target polygon in the target video to determine a position of the target polygon in each image frame of the target video, and then add the specified image to the target polygon in each image frame according to the position of the target polygon in each image frame.

In order to improve real-time performance for tracking the target polygon, in a process of tracking a target polygon in a target video, the electronic device can perform polygon detection on a first image frame of the target video after acquiring the target video to obtain each vertex of the target polygon, and track each vertex of the target polygon in a first subsequent image frame sequence of the target video after and adjacent to the first image frame according to a first vertex position of each vertex of the target polygon in the first image frame.

Therefore, the electronic device can track a target polygon to be detected only by tracking the vertices of the target polygon, so that only a small amount of calculation is required for the tracking process, which improves real-time performance of tracking the target polygon; and can also track the target in a continuous video frame sequence, which improves accuracy of tracking the target polygon.

The target tracking method provided by embodiments of the present disclosure is first described below in conjunction with FIGS. 1 to 6. In the embodiments of the present disclosure, the target tracking method can be executed by an electronic device or a server, without limitation herein. Among them, the electronic device may include a mobile phone, a tablet computer, a desktop computer, a laptop computer, a vehicle-mounted terminal, a wearable electronic device, an all-in-one machine, a smart home device and other devices with communication functions, and may also be a device simulated by a virtual machine or a simulator. The server may include a device with storage and computing functions, such as a cloud server or a server cluster.

The following is an example of a target tracking method performed by an electronic device for detailed explanation.

FIG. 1 shows a schematic flowchart of a target tracking method provided by an embodiment of the present disclosure. As shown in FIG. 1, the target tracking method may include the following steps.

S110, acquiring a target video, where the target video includes a first image frame and a first subsequent image frame sequence after and adjacent to the first image frame.

In the embodiment of the present disclosure, the electronic device can acquire a target video that is needed for target tracking.

In some embodiments, the target video may include a video shot by the electronic device in real-time. In other embodiments, the target video may also include a video sent by other devices to the electronic device, that is, the target video may also include a video received by the electronic device and sent by other devices. In other embodiments, the target video may also include a video uploaded by a user. The present disclosure does not limit to this.

In an embodiment of the present disclosure, the first image frame may be an image frame for determining a tracking target.

In some embodiments, the first image frame may include an image frame in which the tracking target first appears in the target video.

In a case that the tracking target includes a target polygon, the first image frame may include an image frame in which the target polygon first appears in the target video.

In other embodiments, the first image frame may also include any image frame in which the tracking target appears in the target video.

In the case that the tracking target includes a target polygon, the first image frame may also include any image frame in which the target polygon appears in the target video.

In the embodiment of the present disclosure, the target polygon may be any polygon preset as required. For example, the target polygon may be a triangle, a rectangle, a parallelogram, a trapezoid, a pentagon, a hexagon, etc., without limitation herein.

In the embodiment of the present disclosure, the first subsequent image frame sequence is an image frame sequence after and adjacent to the first image frame, and the first subsequent image frame sequence may include at least one image frame, that is, the first subsequent image frame sequence may include at least one image frame after and adjacent to the first image frame.

S120, performing polygon detection on the first image frame to obtain each vertex of a target polygon.

In the embodiment of the present disclosure, after acquiring the target video, the electronic device can perform polygon detection for a target shape on the first image frame in the target video to obtain each vertex of the target polygon, so as to track each vertex of the target polygon as a tracking target, and further realize tracking of the target polygon.

In an implementation, the target shape may be a shape corresponding to a polygon to be tracked that is preset as required. For example, the target shape may be a triangle shape, a rectangle shape, a parallelogram shape, a trapezoid shape, a pentagon shape, a hexagon shape, etc., without limitation herein.

In an implementation, the electronic device can use any target detection algorithm to perform the polygon detection for the target shape on the first image frame, as long as it is able to detect the target polygon with the target shape, without limitation herein.

In one example, after acquiring the target video, the electronic device can input the first image frame into a pre-trained target detection model for detecting a polygon with the target shape, and obtain each vertex of the target polygon in the first image frame output by the target detection model.

S130, tracking each vertex of the target polygon in the first subsequent image frame sequence according to a first vertex position of each vertex of the target polygon in the first image frame.

In the embodiment of the present disclosure, after acquiring each vertex of the target polygon in the first image frame, the electronic device can track each vertex of the target polygon in the first subsequent image frame sequence of the target video after and adjacent to the first image frame according to a first vertex position of each vertex of the target polygon in the first image frame.

In an implementation, S130 may specifically include: tracking each vertex of the target polygon in the first subsequent image frame sequence according to the first vertex position based on an optical flow algorithm.

The optical flow algorithm may be any optical flow algorithm preset as required, for example, the optical flow algorithm may be a sparse optical flow tracking (KLT) algorithm, a Particle Filter (pf for short) algorithm, etc., without limitation herein.

In one example, a specific process of tracking each vertex of the target polygon based on the optical flow algorithm may include:

for the first image frame of the first subsequent image frame sequence, a motion vector of each vertex of the target polygon in the first image frame may be acquired, and then the vertex position of each vertex of the target polygon in a first image frame of the first subsequent image frame sequence may be predicted based on the acquired motion vector and the first vertex position of each vertex of the target polygon in the first image frame, thus realizing the tracking of each vertex of the target polygon in the first image frame of the first subsequent image frame sequence.

For any non-first image frame of the first subsequent image frame sequence, a motion vector of each vertex of the target polygon in a previous image frame of the non-first image frame in the first subsequent image frame sequence may be acquired, and then based on the acquired motion vectors and the vertex position of each vertex of the target polygon in the previous image frame in the non-first image frame of the first subsequent image frame sequence, the vertex position of each vertex of the target polygon in the non-first image frame of the first subsequent image frame sequence may be predicted, thus realizing the tracking of each vertex of the target polygon in the non-first image frame of the first subsequent image frame sequence.

In the embodiment of the present disclosure, after the electronic device tracks each vertex of the target polygon in the image frame of the first subsequent image frame sequence, every two adjacent vertices in the tracked vertices can be connected to obtain an image region to which the target polygon belongs in the image frame, and an image in the image region is the image of the target polygon in the image frame.

For example, taking a pentagonal street sign as an example, when the electronic device tracks the pentagonal street sign, each vertex of the pentagonal can be identified in the first image frame of the target video, and then tracked in the first subsequent image frame sequence after and adjacent to the first image frame. The tracking result can be shown in FIG. 2.

Figure 2:
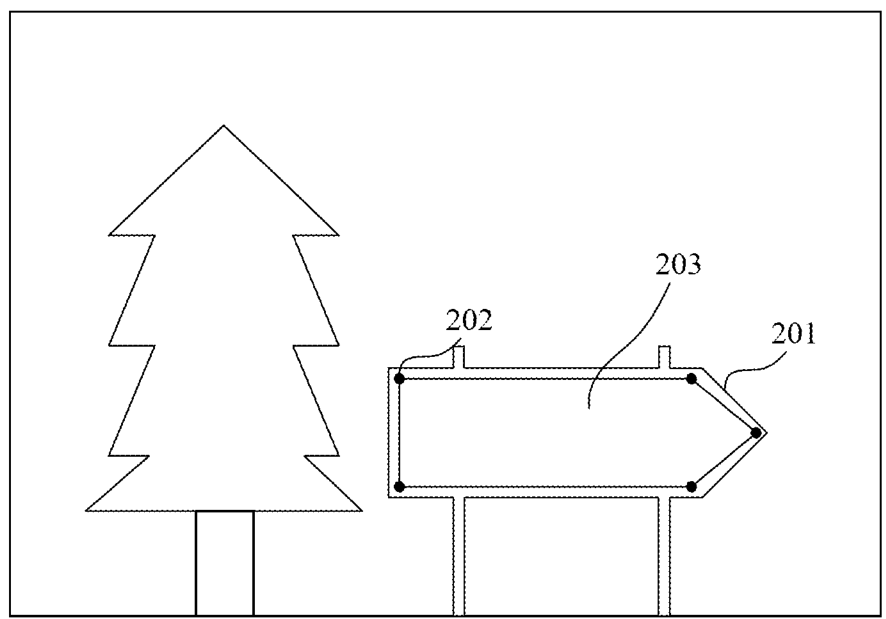
FIG. 2 is a schematic diagram of a pentagon tracking result provided by an embodiment of the present disclosure.

FIG. 2 shows a schematic diagram of a pentagon tracking result provided by an embodiment of the present disclosure.

As shown in FIG. 2, signpost 201 as a whole is in an image frame, and the electronic device can track five vertices 202 of signpost 201 in this image frame, and then connect every two adjacent vertices 202 to obtain an image region 203 (solid line region) to which the signpost 201 belongs in the image frame, and an image within the image region 203 is an image of the signpost 201 in the image frame.

After the signpost is tracked in real-time in the first subsequent image frame sequence, functions such as adding specified content in the signpost, automatically acquiring image content in the signpost, and automatically acquiring an image frame with the signpost can be realized.

The specified content may include text, static image, dynamic image, video, etc., without limitation herein.

The embodiment of the present disclosure, on one hand, can first detect each vertex of a target polygon to be detected in a first image frame of a target video, and then track each vertex of the target polygon to be detected in a first subsequent image frame sequence after the first image frame, and thus the target polygon to be detected can be tracked only by tracking the vertices of the target polygon, so that only a small amount of calculation is required for a tracking process, which improves real-time performance of tracking the target polygon; and on the other hand, can also track the target in a continuous video frame sequence, which improves accuracy of tracking the target polygon.

In another embodiment of the present disclosure, another target tracking method is provided in order to improve reliability of target tracking.

Figure 3:
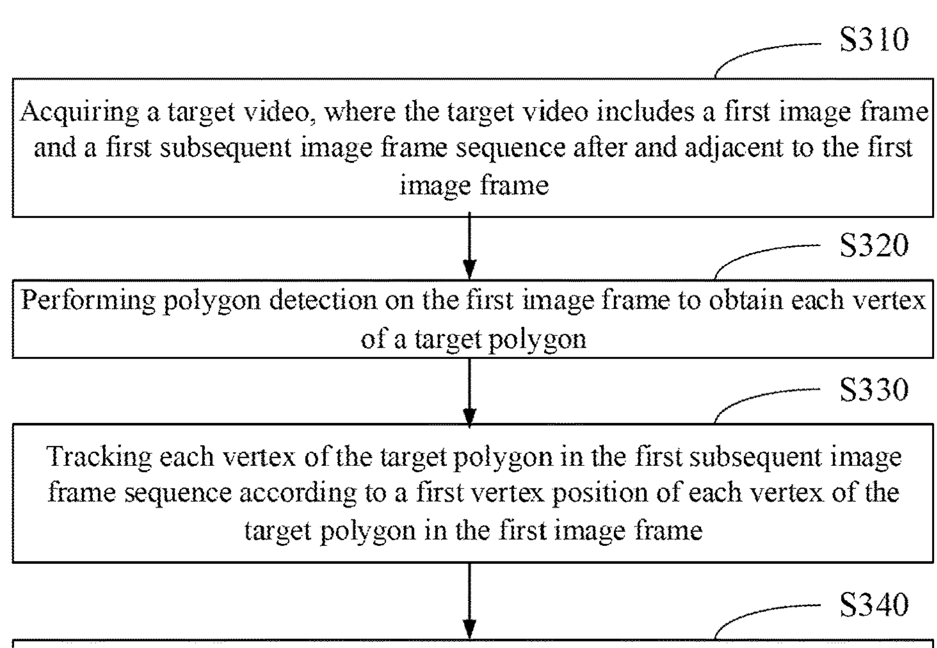
FIG. 3 is a schematic flowchart of a target tracking method provided by an embodiment of the present disclosure.

FIG. 3 shows a schematic flowchart of a target tracking method provided by an embodiment of the present disclosure.

As shown in FIG. 3, the target tracking method may include the following steps.

S310, acquiring a target video, where the target video includes a first image frame and a first subsequent image frame sequence after and adjacent to the first image frame.

S320, performing polygon detection on the first image frame to obtain each vertex of a target polygon.

S330, tracking each vertex of the target polygon in the first subsequent image frame sequence according to a first vertex position of each vertex of the target polygon in the first image frame.

S310-S330 are similar to S110-S130 shown in FIG. 1, and will not be repeated here.

S340, in a case of determining that the target polygon has an untracked vertex in a second image frame of the first subsequent image frame sequence, relocating the untracked vertex according to a second vertex position of a tracked vertex of the target polygon in the second image frame in the second image frame and a third vertex position of each vertex of the target polygon in a previous image frame of the second image frame to obtain a relocated vertex position of the untracked vertex in the second image frame.

In the embodiment of the present disclosure, a tracking situation of each vertex of the target polygon can be detected in real-time during the process that each vertex of the target polygon is tracked by the electronic device in the first subsequent image frame sequence. If the electronic device determines that the target polygon has an untracked vertex in a second image frame of the first subsequent image frame sequence, the untracked vertex can be relocated according to the second vertex position of the tracked vertex in the second image frame in the second image frame and the third vertex position of each vertex of the target polygon in the previous image frame of the second image frame to obtain the relocated vertex position of the untracked vertex in the second image frame.

In the embodiment of the present disclosure, the second image frame may be any image frame in the first subsequent image frame sequence.

In a case that the second image frame is the first image frame in the first subsequent image frame sequence, the previous image frame of the second image frame may be the first image frame. At this time, the electronic device can take the first vertex position of each vertex of the target polygon in the first image frame as the third vertex position of each vertex of the target polygon in the previous image frame of the second image frame, Thus, the electronic device can relocate the untracked vertex in the second image frame according to the second vertex position and the first vertex position to obtain the relocated vertex position of the untracked vertex in the second image frame.

In the case that the second image frame is a non-first image frame in the first subsequent image frame sequence, the previous image frame of the second image frame may be an image frame before and adjacent to the second image frame in the first subsequent image frame sequence. At this time, the third vertex position of each vertex of the target polygon in the previous image frame of the second image frame may be the vertex position of each vertex of the target polygon in the image frame. Thus, the electronic device can relocate the untracked vertex in the second image frame according to the second vertex position and the third vertex position to obtain the relocated vertex position of the untracked vertex in the second image frame.

In the embodiment of the present disclosure, the untracked vertex includes a vertex that is untracked in the second image frame among the vertices of the target polygon. The number of the untracked vertices may be one or multiple, without limitation herein.

In the embodiment of the present disclosure, the electronic device can determine that the target polygon has the untracked vertex in the second image frame of the first subsequent image frame sequence in a case of detecting multiple tracking situations of each vertex of the target polygon.

In an implementation, the determining that the target polygon has the untracked vertex in the second image frame of the first subsequent image frame sequence may specifically include: in a case that the target polygon has a vertex that is failed to be tracked in the second image frame or the target polygon has a vertex that has been moved out of the second image frame in the second image frame, determining that the target polygon has the untracked vertex in the second image frame.

Specifically, the electronic device can determine that the target polygon has the untracked vertex in the second image frame in case of detecting that the tracking situations of each vertex of the target polygon include the presence of a vertex in the second image frame that is failed to be tracked or the presence of a vertex that has been moved out of the second image frame.

Further, the presence of the vertex in the second image frame that is failed to track means that the vertex is present in the second image frame, but the electronic device fails to predict the vertex position of the vertex in the second image frame, resulting in that the electronic device fails to track all the vertices of the target polygon.

Further, the presence of the vertex that has been moved out of the second image frame means that the vertex position predicted by the electronic device in the second image frame is not within an image range of the second image frame. At this time, the electronic device will not record the predicted vertex position of the vertex in the second image frame, resulting in that the electronic device fails to track all the vertices of the target polygon.

As can be seen, the electronic device can determine whether the target polygon has the untracked vertex in the second image frame by detecting the number of the tracked vertex.

In the embodiment of the present disclosure, in an implementation, the determining that the target polygon has the untracked vertex in the second image frame of the first subsequent image frame sequence may specifically include may specifically include: if it is detected that a number of the tracked vertex is less than the total number of vertices of the target polygon, determining that the target polygon has the untracked vertex in the second image frame.

In the embodiment of the present disclosure, after the electronic device has finished tracking each vertex of the target polygon in the second image frame in the first subsequent image frame sequence, if a tracked vertex of the target polygon is detected, the number of vertex tracked in the second image frame can be detected. If it is detected that the number of the tracked vertex is equal to the total number of vertices of the target polygon, it is determined that all vertices of the target polygon are tracked in the second image frame. If it is detected that the number of the tracked vertex is less than the total number of vertices of the target polygon, it is determined that there are untracked vertices of the target polygon in the second image frame, and then which vertex of the target polygon does not exist among the tracked vertices is determined, and the detected untracked vertex is treated as the untracked vertex. The situation that causes the electronic device to detect that the number of the tracked vertex is less than the total number of vertices of the target polygon may include at least the above two situations.

In an embodiment of the present disclosure, in an implementation, S340 may specifically include:

calculating a target homography matrix according to the second vertex position and the third vertex position; and performing homography transformation on a vertex position of the untracked vertex in the previous image frame of the second image frame by using the target homography matrix, to obtain the relocated vertex position.

Specifically, the electronic device can calculate the target homography matrix between each vertex of the target polygon in the second image frame and each vertex of the target polygon in the previous image frame of the second image frame according to the second vertex position and the third vertex position, and then the vertex position of the untracked vertex in the previous image frame of the second image frame is multiplied with the target homography matrix to realize homography transformation of the vertex position of the untracked vertex in the previous image frame of the second image frame, and thus the relocated vertex position of the untracked vertex in the second image frame is obtained.

In an implementation, the electronic device may calculate the target homography matrix based on an algorithm including, but not limited to a random sampling consistency algorithm (RANSAC for shot).

Therefore, in the embodiment of the present disclosure, in a case that a part of the vertices of the target polygon fails to be tracked in the second image frame, the homography matrix may be calculated by using other vertices that are correctly tracked, and then the homography matrix is used to perform the homography transformation on the vertices that are failed to be tracked, so as to recover the vertex positions of the vertices that are failed to track in the second image frame. In a case that a part of the tracked target polygon moves out of the video frame causing some of the vertices of the tracked target polygon to move out of the second image frame, the homography matrix can be calculated by using the vertices still in the second image frame, and then the homography transformation is performed on the vertices moved out of the second image frame by using the homography matrix, so as to recover the vertex positions of the vertices that are not in the image range of the second image frame until all vertices of the target polygon re-enter the video frame.

In the embodiment of the present disclosure, after the electronic device relocates the untracked vertex in the second image frame, every two adjacent vertices of the tracked vertex and the relocated vertex can be connected to obtain an image region to which the target polygon belongs in the image frame, and an image in the image region is the image of the target polygon in the image frame.

For example, when the electronic device tracks the pentagonal street sign, each vertex of the pentagonal can be identified in the first image frame of the target video, and then tracked in the first subsequent image frame sequence after and adjacent to the first image frame. In the process of tracking, if it is determined that a part of the target polygon moves out of the video frame in the second image frame of the first subsequent image frame sequence, the tracking result may be as shown in FIG. 4.

Figure 4:
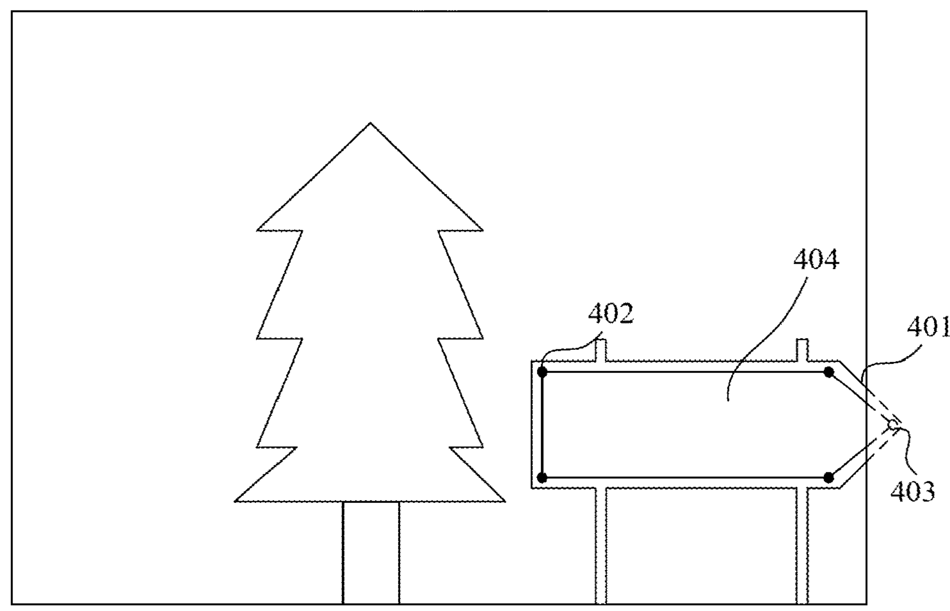
FIG. 4 is a schematic diagram of another pentagon tracking result provided by an embodiment of the present disclosure.

FIG. 4 shows a schematic diagram of a pentagon tracking result provided by an embodiment of the present disclosure.

As shown in FIG. 4, a part of signpost 401 moves out of the image frame. The electronic device can track four actual vertices 402 of the signpost 401 within the image frame, and can relocate a vertex of the untracked signpost 401 by using the tracked four actual vertices 402 to obtain a relocated vertex 403 of the signpost 401. Furthermore, every two adjacent vertices in the four actual vertices 402 and the relocated vertex 403 can be connected respectively to obtain an image area 404 (solid line area) to which the signpost 401 belongs in the image frame, and the image in the image region 404 is the image of the signpost 401 in the image frame.

In the embodiment of the present disclosure, the number of tracked vertices needs to reach a preset number threshold corresponding to a preset homography matrix algorithm, and the electronic device can calculate the homography matrix according to the positions of the tracked vertices.

In order to ensure that the homography matrix can be calculated reliably when the number of tracked vertices does not reach the preset number threshold corresponding to the preset homography matrix algorithm, in the embodiment of the present disclosure, the target polygon may be further tracked by tracking feature points of the target polygon, in order to use the tracked feature points to assist the tracked vertices in the calculation of the homography matrix when the number of the tracked vertices does not reach the preset number threshold.

In these embodiments, in an implementation, the target tracking method may further include:

performing feature point detection on the target polygon to obtain each feature point of the target polygon; and tracking each feature point of the target polygon in the first subsequent image frame sequence according to a first feature point position of each feature point of the target polygon in the first image frame.

Specifically, after obtaining each vertex of the target polygon, the electronic device can also use a preset feature extraction algorithm to perform the feature point detection on the target polygon in the first image frame to obtain each feature point of the target polygon; and while tracking each vertex of the target polygon in the first subsequent image frame sequence according to the first vertex position of each vertex of the target polygon in the first image frame, each feature point of the target polygon is simultaneously tracked in the first subsequent image frame sequence according to the first feature point position of each feature point of the target polygon in the first image frame. That is, while the electronic device tracks each vertex of the target polygon in any image frame in the first subsequent image frame sequence, it also tracks each feature point of the target polygon in that image frame simultaneously. That is, in each image frame in the first subsequent image frame sequence, each vertex and each feature point of the target polygon are tracked simultaneously.

In an implementation, the preset feature extraction algorithm may be any preset feature extraction algorithm as required, for example, the feature extraction algorithm may be a fast (Fast) feature extraction algorithm, without limitation herein.

In an implementation, the tracking each feature point of the target polygon in the first subsequent image frame sequence according to the first feature point position of each feature point of the target polygon in the first image frame may specifically include tracking each feature point of the target polygon in the first subsequent image frame sequence according to the first feature point position based on the optical flow algorithm.

The specific method of tracking each feature point of the target polygon in the first subsequent image frame sequence is similar to the specific method of tracking each vertex of the target polygon, and will not be repeated here.

In these embodiments, further, the calculating the target homography matrix according to the second vertex position and the third vertex position may specifically include:

- in a case that the number of the tracked vertex is greater than or equal to a preset number threshold, calculating the target homography matrix according to the second vertex position and the third vertex position; and
- in a case that the number of the tracked vertex is less than the preset number threshold, calculating the target homography matrix according to the second vertex position, the third vertex position, a second feature point position of a tracked feature point of the target polygon in the second image frame in the second image frame and a third feature point position of each feature point of the target polygon in the previous image frame of the second image frame.

When the number of tracked points (for example, the total number of vertices and feature points) reaches the preset number threshold corresponding to the preset homography matrix algorithm, the electronic device can calculate the homography matrix according to the positions of tracked points. Therefore, in case that the number of the tracked vertices is greater than or equal to the preset number threshold, the electronic device can directly calculate the target homography matrix according to the second vertex position and the third vertex position. In case that the number of the tracked vertices is less than the preset number threshold, it is necessary to calculate the target homography matrix according to the second vertex position, the third vertex position, the second feature point position and the third feature point position, so as to ensure the reliability of the calculated target homography matrix, and then reliably relocate the untracked vertices, thus improving the reliability of tracking the target polygon.

Taking the preset number threshold corresponding to the homography matrix algorithm as 3 for example, in case that the number of tracked vertices is greater than or equal to 3, the electronic device can directly select three vertices from the tracked vertices, and then select the positions corresponding to the three vertices according to the second vertex position and the third vertex position, and calculate the target homography matrix. When the number of tracked vertices is less than 3, three points can be selected from the tracked vertices and feature points, and then, according to the second vertex position, the third vertex position, the second feature point position and the third feature point position, three pairs of positions corresponding to these three pairs of points are selected, and the target homography matrix is calculated, and then the vertex position of the untracked vertice in the previous image frame of the second image frame is multiplied with the target homography matrix to realize homography transformation of the vertex position of the untracked vertex in the previous image frame of the second image frame, and thus the relocated vertex position of the untracked vertex in the second image frame is obtained.

Therefore, in the embodiment of the present disclosure, in the case that the target polygon is still in the video picture but some vertices of the target polygon move out of the video screen, the vertices of the target polygon that move out of the video picture can be relocated, so as to realize the tracking of the target polygon, thereby improving the reliability of target tracking.

In yet another embodiment of the present disclosure, a further target tracking method is provided in order to improve the reliability of target tracking.

Figure 5:
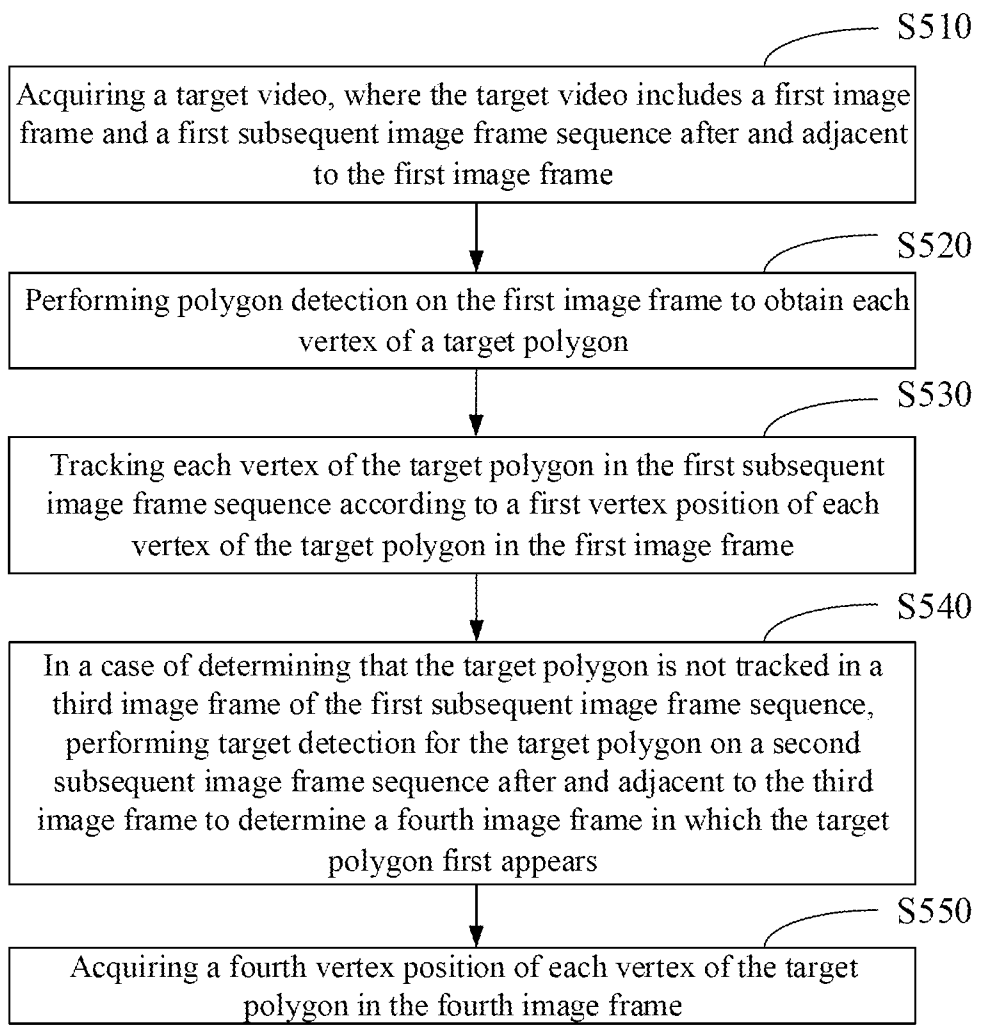
FIG. 5 is a schematic flowchart of a target tracking method provided by an embodiment of the present disclosure.

FIG. 5 shows a schematic flowchart of a target tracking method provided by an embodiment of the present disclosure.

As shown in FIG. 5, the target tracking method may include the following steps.

- S510, acquiring a target video, where the target video includes a first image frame and a first subsequent image frame sequence after and adjacent to the first image frame.
- S520, performing polygon detection on the first image frame to obtain each vertex of a target polygon.
- S530, tracking each vertex of the target polygon in the first subsequent image frame sequence according to a first vertex position of each vertex of the target polygon in the first image frame.
- S510-S530 are similar to S110-S130 shown in FIG. 1, and will not be repeated here.
- S540, in a case of determining that the target polygon is not tracked in a third image frame of the first subsequent image frame sequence, performing target detection for the target polygon on a second subsequent image frame sequence after and adjacent to the third image frame to determine a fourth image frame in which the target polygon first appears.

In the embodiment of the present disclosure, a tracking situation of the target polygon can be detected in real-time during the process that each vertex of the target polygon is tracked by the electronic device in the first subsequent image frame sequence. If the electronic device determines that the target polygon is not tracked in the third image frame of the first subsequent image frame sequence, target detection for the target polygon can be performed on the second subsequent image frame sequence after and adjacent to the third image frame to determine the fourth image frame in the second subsequent image frame sequence in which the target polygon first appears, thereby realizing relocation of the target polygon.

Specifically, the electronic device can determine whether the target polygon is tracked in the third image frame by detecting whether the vertex of the target polygon is tracked.

In an implementation, the determining that the target polygon is not tracked in the third image frame of the first subsequent image frame sequence may specifically include:

if it is detected that each vertex of the target polygon is not tracked in the third image frame, determining that the target polygon is not tracked in the third image frame.

In the embodiment of the present disclosure, after the electronic device finishes tracking each vertex of the target polygon in the third image frame in the first subsequent image frame sequence, if it is detected that no vertex of the target polygon is tracked, it can be determined that the target polygon is not tracked in the third image frame. The situation that causes the electronic device to detect that no vertex of the target polygon is tracked may at least include that the target polygon completely moves out of the third image frame, that is, the target polygon completely moves out of the video screen.

In the embodiment of the present disclosure, the third image frame may be any image frame in the first subsequent image frame sequence.

In the case that the third image frame is the last image frame in the first subsequent image frame sequence, the electronic device may end the tracking of the target polygon.

In a case that the third image frame is a non-last image frame in the first subsequent image frame sequence, the electronic device may perform the target detection for the target polygon on the second subsequent image frame sequence after and adjacent to the third image frame to determine the fourth image frame in which the target polygon first appears.

In an embodiment of the present disclosure, in an implementation, S540 may specifically include:

performing polygon detection in the second subsequent image frame sequence to determine a fifth image frame in which a polygon to be matched first appears, where a shape of the polygon to be matched and a shape of the target polygon are identical;

calculating a similarity between the polygon to be matched and the target polygon;

in a case that the similarity is greater than or equal to a preset threshold, determining the fifth image frame as the fourth image frame; and in case that the similarity is less than the preset threshold, performing target detection for the target polygon on a third subsequent image frame sequence after and adjacent to the fifth image frame, and determining an image frame in which the target polygon first appears as the fourth image frame.

Specifically, the electronic device may perform the polygon detection for the target shape for each image frame in the second subsequent image frame sequence sequentially in order from first to last in time, and take an image frame in which the polygon to be matched with the same shape as the target polygon is detected for the first time as the fifth image frame, and then calculate the similarity between the polygon to be matched in the fifth image frame and the target polygon. If the similarity is greater than or equal to the preset threshold, the fifth image frame is determined as the fourth image frame, otherwise, a third subsequent image frame sequence after and adjacent to the fifth image frame is treated as a new second subsequent image frame sequence, a new fifth image frame in which the polygon to be matched first appears is determined again in the new second subsequent image frame sequence, and the similarity between the polygon to be matched in the new fifth image frame and the target polygon is calculated. Until it is detected that there is a fourth image frame with a similarity to the target polygon greater than or equal to the preset threshold is detected, or a polygon to be matched with a similarity to the target polygon greater than or equal to the preset threshold is not detected in the last image frame of the second subsequent image frame sequence, the relocation of the target polygon is ended.

In an implementation, the method that the electronic device performs polygon detection for the target shape on each image frame in the second subsequent image frame sequence is similar to the method that the electronic device performs polygon detection for the target shape on the first image frame, without limitation herein.

In an implementation, the electronic device may calculate the similarity between the polygon to be matched and the target polygon based on a preset similarity algorithm.

The similarity algorithm can be any preset similarity algorithm as required, for example, the similarity algorithm may be a sum of squared differences (SSD for shot) algorithm, which is not limited here.

In some embodiments of the present disclosure, in order to calculate the similarity between the polygon to be matched and the target polygon, it is also necessary to first extract an initial image of the target polygon.

In an implementation, after S520, the target tracking method may further include:

acquiring an initial image of the target polygon in the first image frame.

Specifically, after the electronic device obtains each vertex of the target polygon, every two adjacent vertices of the vertexs are connected to obtain an image region to which the target polygon belongs in the first image frame, and then an image within the image region is acquired, and the image in the image region is taken as the initial image of the target polygon.

The initial image of the target polygon may be used as a template of the target polygon.

Further, the image region to which the target polygon belongs is a region including the graphic boundary line and a inside part of the image of the target polygon. Continuing with the example of the pentagonal signpost, the image area to which the pentagon belongs includes a pentagon boundary line and a inside part of the pentagon, so that the image within the image region to which the pentagon belongs can reflect characteristics of the pentagon in terms of shape, size and color.

Accordingly, the calculating the similarity between the polygon to be matched and the target polygon may specifically include:

acquiring an image to be matched of the polygon to be matched in the fifth image frame; and performing similarity calculation on the initial image and the image to be matched to obtain the similarity.

Specifically, in the fifth image frame, the electronic device can connect every two adjacent vertices of vertexs of the polygon to be matched obtained by performing polygon detection in the fifth image frame to obtain an image region to which the polygon to be matched belongs in the fifth image frame, and then acquire the image in the image region, and take the image in the image region as the image to be matched of the polygon to be matched. Then, the electronic device can calculate the similarity between the initial image and the image to be matched based on the preset similarity algorithm to obtain the similarity.

In some embodiments, in a case where there is a polygon to be matched in the fifth image frame, the similarity between the image to be matched of the polygon to be matched and the initial image of the target polygon may be calculated to obtain the similarity between the polygon to be matched and the target polygon, and if the similarity is greater than the similarity threshold, the fifth image frame is determined as the fourth image frame.

In other embodiments, in a case where there are multiple polygon to be matched in the fifth image frame, the respective similarity between the image to be matched of each polygons to be matched and the initial image of the target polygon may be calculated to obtain the similarity between each polygon to be matched and the target polygon, and if at least one of the similarities is greater than the similarity threshold, the fifth image frame is determined as the fourth image frame.

S550, acquiring a fourth vertex position of each vertex of the target polygon in the fourth image frame.

In the embodiment of the present disclosure, after determining the fourth image frame in which the target polygon first appears, the electronic device may acquire the fourth vertex position of each vertex of the target polygon in the fourth image frame to continue tracking the target polygon in the target video.

In some embodiments, S550 may specifically include:

in the case that there is one polygon to be matched in the fourth image frame whose similarity with the target polygon is greater than or equal to the preset threshold, directly determining the position of each vertex of the polygon to be matched in the fourth image frame as the fourth vertex position.

Specifically, if the electronic device detects that there is one polygon to be matched in the fourth image frame whose similarity with the target polygon is greater than or equal to the preset threshold, the polygon to be matched can be directly taken as the target polygon, and the position of each vertex of the polygon to be matched in the fourth image frame is determined as the fourth vertex position.

In other embodiments, S550 may specifically include:

in a case that there are at least two polygons to be matched in the fourth image frame whose similarity with the target polygon is greater than or equal to the preset threshold, determining a position of each vertex of a polygon to be matched with the largest size in the at least two polygons to be matched in the fourth image frame as the fourth vertex position.

Specifically, if the electronic device detects that there are at least two polygons to be matched in the fourth image frame whose similarity with the target polygon is greater than or equal to the preset threshold, the polygon to be matched with the largest size in the at least two polygons to be matched may be directly taken as the target polygon, and the position of each vertex of the polygon to be matched with the largest size in the fourth image frame is determined as the fourth vertex position.

In the embodiment of the present disclosure, in an implementation, after acquiring the fourth vertex position, the electronic device may continue to track each vertex of the target polygon in the subsequent image frame sequence after and adjacent to the fourth image frame according to the fourth vertex position, where the tracking process is similar to the above-mentioned process of tracking each vertex of the target polygon in the first subsequent image frame sequence, and will not be repeated here.

As a result, in the embodiment of the present disclosure, after the target polygon moves out of the video screen as a whole, the target polygon can be relocated in the subsequent video, so as to continue to track the target polygon in the subsequent video, further improving the reliability of target tracking.

Taking the tracking of a rectangle in a video as an example, the target tracking method provided by the embodiment of the present disclosure will be described in detail.

Figure 6:
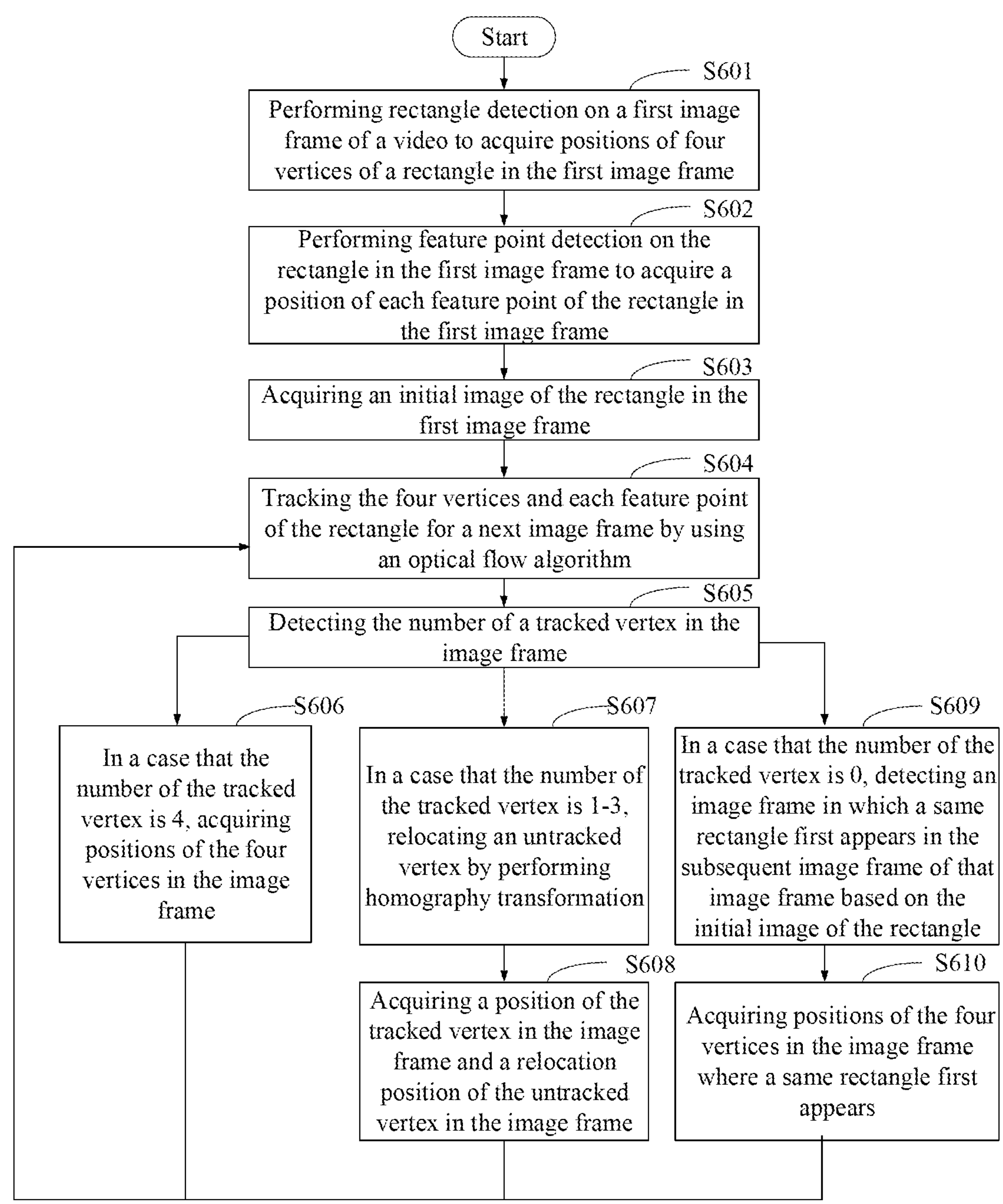
FIG. 6 is a schematic flowchart of a rectangular tracking process provided by an embodiment of the present disclosure.

FIG. 6 is a schematic flowchart of a rectangular tracking process provided by an embodiment of the present disclosure.

As shown in FIG. 6, the process of tracking the rectangular may include the following steps.

S601: performing rectangle detection on a first image frame of a video to obtain four vertices of a rectangle, and acquiring positions of the four vertices of the rectangle in the first image frame.

S602: performing feature point detection on the rectangle in the first image frame to acquire each feature point inside the rectangle, and acquire a position of each feature point in the first image frame.

S603: acquiring an initial image of the rectangle in the first image frame.

S604: tracking the four vertices and each feature point of the rectangle for a next image frame by using an optical flow algorithm.

S605: detecting the number of a tracked vertex in the image frame, where different numbers can represent different tracking situations. If the number of tracked vertex is 4, S606 is executed; if the number of tracked vertex is 1-3, S607 is executed; and if the number of tracked vertex is 0, S609 is executed.

S606: in a case that the number of the tracked vertex is 4, which indicates that all four vertices of the rectangle have been tracked successfully in the image frame, acquiring directly positions of the four vertices in the image frame, and returning to execute S604.

S607: in a case that the number of tracked vertex is 1-3, which indicates that at least one vertex of the rectangle is failed to be tracked in the image frame or a part of the rectangle moves out of the screen, relocating an untracked vertex by performing homography transformation to restore the position of the untracked vertex.

S608: acquiring a position of the tracked vertex in the image frame and a relocation position of the untracked vertex in the image frame, and returning to execute S604.

S609: in a case that the number of the tracked vertex is 0, which indicates that the rectangle moves out of the screen as a whole in the image frame, detecting an image frame in which a same rectangle first appears in the subsequent image frame of that image frame based on the initial image of the rectangle to relocate the rectangle.

S610: acquiring positions of the four vertices in the image frame where a same rectangle first appears, and returning to execute S604.

Thus, the execution of S604-S610 may be repeated until the tracking of the rectangle in the last image frame of the video is completed, then it ends.

To sum up, in the embodiment of the present disclosure, the tracking of existing target polygons within the entire video can be achieved by tracking the vertices of the target polygon and the feature points inside the target polygon, to reduce the calculation amount of the tracking process, and improve the tracking speed, thereby realizing the real-time tracking of the target polygon. In addition, in the embodiment of the present disclosure, in a case of not tracking part of the vertices of the target polygon, a part of the target polygon, or the target polygon as a whole, the vertices of the target polygon and the target polygon can be relocated and the positions of each vertex of the target polygon can be accurately obtained, which improve continuity of tracking the target polygon in the video, thereby improving accuracy of tracking the target polygon.

An embodiment of the present disclosure also provides a target tracking apparatus for realizing the above target tracking method, which will be described below in conjunction with FIG. 7. In the embodiment of the present disclosure, the target tracking apparatus may be an electronic device or a server, without limitation herein. Among them, the electronic device may include a mobile phone, a tablet computer, a desktop computer, a laptop computer, a vehicle-mounted terminal, a wearable electronic device, an all-in-one machine, a smart home device and other devices with communication functions, and may also be a device simulated by a virtual machine or a simulator. The server may include a device with storage and computing functions, such as a cloud server or a server cluster.

Figure 7:
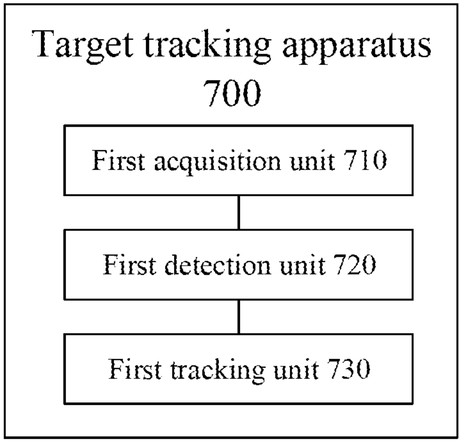
FIG. 7 is a structural schematic diagram of a target tracking apparatus provided by an embodiment of the present disclosure.

FIG. 7 shows a structural schematic diagram of a target tracking apparatus provided by an embodiment of the present disclosure.

As shown in FIG. 7, the target tracking apparatus 700 may include a first acquisition unit 710, a first detection unit 720 and a first tracking unit 730.

The first acquisition unit 710 may be configured to acquire a target video, where the target video includes a first image frame and a first subsequent image frame sequence after and adjacent to the first image frame.

The first detection unit 720 may be configured to perform polygon detection on the first image frame to obtain each vertex of a target polygon.

The first tracking unit 730 may be configured to track each vertex of the target polygon in the first subsequent image frame sequence according to a first vertex position of each vertex of the target polygon in the first image frame.

The embodiment of the present disclosure, on one hand, can first detect each vertex of a target polygon to be detected in a first image frame of a target video, and then track each vertex of the target polygon to be detected in a first subsequent image frame sequence after the first image frame, and thus the target polygon to be detected can be tracked only by tracking the vertices of the target polygon, so that only a small amount of calculation is required for a tracking process, which improves real-time performance of tracking the target polygon; and on the other hand, can also track the target in a continuous video frame sequence, which improves accuracy of tracking the target polygon.

In some embodiments of the present disclosure, the target tracking apparatus 700 may further include a first processing unit, where the first processing unit may be configured to in a case of determining that the target polygon has an untracked vertex in a second image frame of the first subsequent image frame sequence, relocate the untracked vertex according to a second vertex position of a tracked vertex of the target polygon in the second image frame in the second image frame and a third vertex position of each vertex of the target polygon in a previous image frame of the second image frame to obtain a relocated vertex position of the untracked vertex in the second image frame.

In some embodiments of the present disclosure, the target tracking apparatus 700 may further include a first determining unit, where the first determining unit may be configured to, in a case that the target polygon has a vertex that is failed to be tracked in the second image frame or the target polygon has a vertex that has been moved out of the second image frame in the second image frame, determine that the target polygon has the untracked vertex in the second image frame.

In some embodiments of the present disclosure, the first determining unit may be further configured to, if it is detected that a number of the tracked vertex is less than the total number of vertices of the target polygon, determine that the target polygon has the untracked vertex in the second image frame.

In some embodiments of the present disclosure, the first processing unit may include a first processing sub-unit and a second processing sub-unit.

The first processing sub-unit may be configured to calculate a target homography matrix according to the second vertex position and the third vertex position.

The second processing sub-unit may be configured to perform homography transformation on a vertex position of the untracked vertex in the previous image frame of the second image frame by using the target homography matrix, to obtain the relocated vertex position.

In some embodiments of the present disclosure, the target tracking apparatus 700 may further include a second detection unit and a second tracking unit.

The second detection unit may be configured to perform feature point detection on the target polygon to obtain each feature point of the target polygon.

The second tracking unit may be configured to track each feature point of the target polygon in the first subsequent image frame sequence according to a first feature point position of each feature point of the target polygon in the first image frame.

Accordingly, the first processing sub-unit may be further configured to, in a case that the number of the tracked vertex is greater than or equal to a preset number threshold, calculate the target homography matrix according to the second vertex position and the third vertex position; and in a case that the number of the tracked vertex is less than the preset number threshold, calculate the target homography matrix according to the second vertex position, the third vertex position, a second feature point position of a tracked feature point of the target polygon in the second image frame in the second image frame and a third feature point position of each feature point of the target polygon in the previous image frame of the second image frame.

In some embodiments of the present disclosure, the target tracking apparatus 700 may further include a second processing unit and a second acquisition unit.

The second processing unit may be configured to, in a case of determining that the target polygon is not tracked in a third image frame of the first subsequent image frame sequence, perform a target detection for the target polygon on a second subsequent image frame sequence after and adjacent to the third image frame to determine a fourth image frame in which the target polygon first appears.

The second acquisition unit may be configured to acquire a fourth vertex position of each vertex of the target polygon in the fourth image frame.

In some embodiments of the present disclosure, the target tracking apparatus 700 may further include a second determining unit, the second determining unit may be configured to, if it is detected that each vertex of the target polygon is not tracked in the third image frame, determine that the target polygon is not tracked in the third image frame.

In some embodiments of the present disclosure, the second processing unit may include a third processing sub-unit, a fourth processing sub-unit and a fifth processing sub-unit.

The third processing sub-unit may be configured to perform polygon detection in the second subsequent image frame sequence to determine a fifth image frame in which a polygon to be matched first appears, where a shape of the polygon to be matched and a shape of the target polygon are identical.

The fourth processing sub-unit may be configured to calculate a similarity between the polygon to be matched and the target polygon.

The fifth processing sub-unit may be configured to in a case that the similarity is greater than or equal to a preset threshold, determine the fifth image frame as the fourth image.

In some embodiments of the present disclosure, the target tracking apparatus 700 may further include a third acquisition unit, the third acquisition unit may be configured to acquire an initial image of the target polygon in the first image frame.

Accordingly, the fourth processing sub-unit may be further configured to acquire an image to be matched of the polygon to be matched in the fifth image frame; and perform similarity calculation on the initial image and the image to be matched to obtain the similarity.

In some embodiments of the present disclosure, the second acquisition unit may be further configured to, in a case that there are at least two polygons to be matched in the fourth image frame whose similarity with the target polygon is greater than or equal to the preset threshold, determine a position of each vertex of a polygon to be matched with the largest size in the at least two polygons to be matched in the fourth image frame as the fourth vertex position.

In some embodiments of the present disclosure, the first image frame may include an image frame in which the target polygon first appears in the target video.

In some embodiments of the present disclosure, the first tracking unit 730 may be further configured to track each vertex of the target polygon in the first subsequent image frame sequence according to the first vertex position based on an optical flow algorithm.

In some embodiments of the present disclosure, the second tracking unit may be further configured to track each feature point of the target polygon in the first subsequent image frame sequence according to a first feature point position of each feature point of the target polygon in the first image frame based on the optical flow algorithm.

It should be noted that the target tracking apparatus 700 shown in FIG. 7 can perform the various steps in the method embodiments shown in FIGS. 1 to 6, and realize various processes and effects in the method embodiments shown in FIGS. 1 to 6, which will not be repeated here.

The embodiment of the present disclosure also provides a target tracking device. The target tracking device may include a processor and a memory, where the memory may be used to store executable instructions. The processor may be used to read the executable instructions from the memory and execute the executable instructions to implement the target tracking method in the above embodiment.

Figure 8:
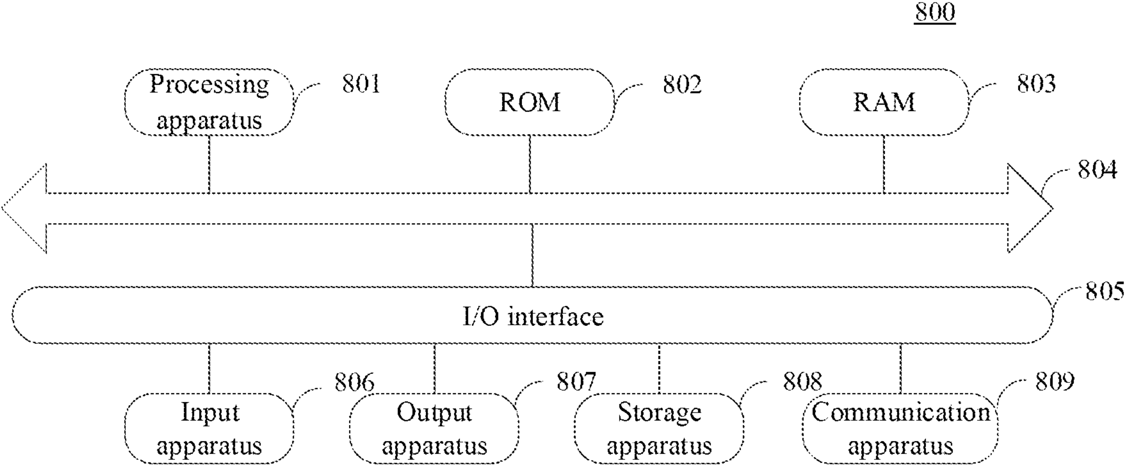
FIG. 8 is a structural schematic diagram of a target tracking device provided by an embodiment of the present disclosure.

FIG. 8 shows a structural schematic diagram of a target tracking device provided by an embodiment of the present disclosure. Referring to FIG. 8 below in detail, which shows a structural schematic diagram of the target tracking device suitable for the embodiment of the present disclosure.

In the embodiments of the present disclosure, the target tracking apparatus may be an electronic device or a server, without limitation herein. The electronic device may include, but is not limited to: a mobile terminal such as a mobile phone, a notebook computer, a digital broadcast receiver, a personal digital assistant (PDA for short), a portable android device (PAD for short), a portable media player (PMP for short), an in-vehicle terminal (e.g., an in-vehicle navigation terminal), a wearable device and so on, and a fixed terminal such as a digital TV, a desktop computer and a smart home device and so on. The server may include a device with storage and computing functions, such as a cloud server or a server cluster.

It should be noted that the target tracking device shown in FIG. 8 is only an example, which should not bring any limitation to the function and the use range of the embodiments of the present disclosure.

As shown in FIG. 8, the target tracking device 800 may include a processing apparatus (such as a central processing unit, a graphics processor, etc.) 801, which may execute various appropriate actions and processing according to a program stored in a read-only memory (ROM for short) 802 or a program loaded into a random access memory (RAM for short) 803 from a storage apparatus 808. In the RAM 803, various programs and data necessary for operations of the target tracking device 800 are also stored. The processing apparatus 801, the ROM 802, and the RAM 803 are connected to each other through a bus 804. An input/output (I/O) interface 805 is also connected to the bus 804.

Usually, the following apparatuses can be connected to the I/O interface 805: an input apparatus 806 including, such as, a touch screen, a touchpad, a keyboard, a mouse, a camera, a microphone, an accelerometer, a gyroscope, etc.; an output apparatus 807 including, such as, a liquid crystal display (LCD for short), a speaker, a vibrator, etc.; a storage apparatus 808 including, such as, a magnetic tape, a hard disk, etc.; and a communication apparatus 809. The target tracking apparatus 809 may allow the electronic device 800 to communicate wirelessly or through wires with other devices to exchange data. Although FIG. 8 shows the target tracking device 800 having various apparatuses, it should be understood that it is not required to implement or have all of the apparatuses illustrated. More or fewer apparatuses may alternatively be implemented or provided.

An embodiment of the present disclosure also provides a computer-readable storage medium storing a computer program, where when a processor executes the computer program, the target tracking method in the above embodiments is implemented.

In particular, according to the embodiments of the present disclosure, the process described above with reference to the flow chart may be implemented as a computer software program.

An embodiment of the present disclosure also provides a computer program product. The computer program product may include a computer program, where the target tracking method in the above embodiments is implemented when the computer program is executed by a processor.

For example, an embodiment of the present disclosure includes a computer program product including a computer program carried on a non-transient computer-readable medium, where the computer program contains program codes for executing the method shown in the flow chart. In such embodiment, the computer program can be downloaded and installed from a network through the communication apparatus 809, or installed from the storage apparatus 808 or installed from the ROM 802. When the computer program is executed by the processing apparatus 801, the above functions defined in the target tracking methods of the embodiments of the present disclosure are executed.

The embodiments of the present disclosure also provide a computer program, stored in a readable storage medium, where one or more processors of an electronic device can read the computer program from the readable storage medium, and the one or more processors execute the computer program enabling the electronic device to perform the target tracking method in the above embodiments.

It should be noted that the above computer-readable medium in the present disclosure may be a computer-readable signal medium or a computer-readable storage medium or any combination of the two. The computer-readable storage medium can be, for example, but not limited to, an electrical, magnetic, optical, electromagnetic, infrared, or semiconductor system, apparatus, or device, or any combination of the above. More specific examples of computer-readable storage media may include, but are not limited to, electrical connections with one or more wires, portable computer disks, hard disks, random access memories (RAM), read-only memories (ROM), erasable programmable read-only memories (EPROM or flash memory for short), optical fibers, compact disk read-only memories (CD-ROM for short), optical storage devices, and magnetic storage devices. In the present disclosure, the computer-readable storage medium can be any tangible medium containing or storing a program, where the program can be used by or in combination with an instruction execution system, apparatus or device. And in the present disclosure, the computer-readable signal medium may include a data signal propagated in baseband or as a part of a carrier wave, in which computer-readable program code is carried. Such a propagated data signal may take a variety of forms, including but not limited to an electromagnetic signal, an optical signal, or any suitable combination of the above. The computer-readable signal medium may also be any computer-readable medium other than the computer-readable storage medium, and the computer-readable signal medium can send, propagate, or transmit a program for use by, or use in combination with, an instruction execution system, apparatus or device. The program code contained on the computer-readable medium may be transmitted using any suitable medium including, but not limited to, an electrical wire, an optical cable, radio frequency (RF for short) or the like, or any suitable combination of the above.

In some embodiments, clients and servers may communicate with any currently known or future-developed network protocol such as HTTP, and may be interconnected with any form or medium of digital data communication (e.g., a communications network). Examples of communication networks include a local area network (LAN for short) and a wide area network (WAN for short), an Internet (e.g., Internet), and an end-to-end network (e.g., ad hoc end-to-end networks), and any currently known or future developed networks.

The above computer-readable medium may be contained in the above target tracking device; or may exist separately instead of being assembled into the target tracking device.

The above computer-readable medium carries one or more programs. When the one or more programs are executed by the target tracking device, the target tracking device is caused to execute the following steps:

acquiring a target video, where the target video includes a first image frame and a first subsequent image frame sequence after and adjacent to the first image frame; performing polygon detection on the first image frame to obtain each vertex of a target polygon; and tracking each vertex of the target polygon in the first subsequent image frame sequence according to a first vertex position of each vertex of the target polygon in the first image frame.

In an embodiment of the present disclosure, the computer program codes for executing the operations of the present disclosure can be written in one or more programming languages or a combination thereof, where the above programming languages include, but not limited to object-oriented programming languages such as Java, Smalltalk, C++, and also conventional procedural programming languages such as "C" language or similar programming languages. The program codes can be completely executed on the user computer, partially executed on the user computer, executed as an independent software package, partially executed on the user computer and partially executed on a remote computer, or completely executed on a remote computer or a server. In case of involving a remote computer, the remote computer can be connected to the user computer through any kind of network, including a local area network (LAN) or a wide area network (WAN), or can be connected to an external computer (for example, by using Internet service providers to connect through the Internet).

The flow charts and block diagrams in the drawings illustrate the architecture, functions and operations of possible implementations of systems, methods and computer program products according to various embodiments of the present disclosure. In this regard, each block in the flowcharts or block diagrams may represent a module, a program segment, or a portion of code, which contains one or more executable instructions for implementing a specified logical function. It should also be noted that in some alternative implementations, the functions marked in the blocks may also occur in a different order than those marked in the drawings. For example, two blocks shown one after the other can actually be executed in parallel substantially, or they may sometimes be executed in an opposite order, depending on functions involved. It should still be noted that each block in the block diagrams and/or flowcharts, and a combination of blocks in the block diagrams and/or flowcharts, may be implemented with a dedicated hardware-based system that performs specified functions or operations, or may be implemented with a combination of dedicated hardware and computer instructions.

The involved units described in the embodiments of the present disclosure can be implemented by software or hardware. Where a name of the unit does not constitute a limitation on the unit itself in some cases.

The functions described above herein may be at least partially performed by one or more hardware logic components. For example, without limitation, exemplary types of hardware logic components that can be used include a field programmable gate array (FPGA for short), an application-specific integrated circuit (ASIC for short), an application specific standard product (ASSP for short), a system on chip (SOC for short), a complex programmable logic device (CPLDfor short), etc.

In the context of the present disclosure, the machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the above contents. More specific examples of the machine-readable storage medium may include an electrical connection based on one or more wires, a portable computer disk, a hard disk, a random access memory (RAM), a read-only memory (ROM), an electrical programmable read-only memory (EPROM or flash memory), an optical fiber, a portable compact disc read-only memory (CD-ROM), an optical storage device, a magnetic storage device, or any suitable combination of the above contents.

The above description is only a description of preferred embodiments of the present disclosure and applied technical principles. It should be understood by those skilled in the art that the present disclosure scope involved in the present disclosure is not limited to the technical solution formed by the specific combination of the above technical features, but also covers other technical solutions formed by any combination of the above technical features or equivalent features thereof without departing from the above disclosure concept. For example, the technical solution formed by replacing the above features with the technical features with similar functions disclosed in (but not limited to) the present disclosure.

In addition, although the operations are depicted in a particular order, this should not be understood as requiring that the operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of a separate embodiment may also be implemented in a single embodiment in combination. On the contrary, various features described in the context of a single embodiment can also be implemented in multiple embodiments individually or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are merely exemplary forms for implementing the claims.

The invention claimed is:

1. A target tracking method, applied to a target tracking apparatus, comprising:

acquiring a target video, wherein the target video comprises a first image frame and a first subsequent image frame sequence after and adjacent to the first image frame;

performing polygon detection on the first image frame to obtain each vertex of a target polygon;

tracking each vertex of the target polygon in the first subsequent image frame sequence according to a first vertex position of each vertex of the target polygon in the first image frame, to determine a position of a tracking target corresponding to the target polygon in the first subsequent image frame sequence; and in a case of determining that the target polygon has an untracked vertex in a second image frame of the first subsequent image frame sequence, relocating the untracked vertex according to a second vertex position of a tracked vertex of the target polygon in the second image frame in the second image frame and a third vertex position of each vertex of the target polygon in a previous image frame of the second image frame to obtain a relocated vertex position of the untracked vertex in the second image frame.

2. The method according to claim 1, wherein the determining that the target polygon has the untracked vertex in the second image frame of the first subsequent image frame sequence comprises:

in a case that the target polygon has a vertex that is failed to be tracked in the second image frame or the target polygon has a vertex that has been moved out of the second image frame in the second image frame, determining that the target polygon has the untracked vertex in the second image frame.

3. The method according to claim 1, wherein the determining that the target polygon has the untracked vertex in the second image frame of the first subsequent image frame sequence comprises:

upon detecting that a number of the tracked vertex is less than the total number of vertices of the target polygon, determining that the target polygon has the untracked vertex in the second image frame.

4. The method according to claim 1, wherein the relocating the untracked vertex according to the second vertex position of the tracked vertex of the target polygon in the second image frame in the second image frame and the third vertex position of each vertex of the target polygon in the previous image frame of the second image frame to obtain the relocated vertex position of the untracked vertex in the second image frame comprises:

calculating a target homography matrix according to the second vertex position and the third vertex position; and performing homography transformation on a vertex position of the untracked vertex in the previous image frame of the second image frame by using the target homography matrix, to obtain the relocated vertex position.

5. The method according to claim 4, further comprising:

performing feature point detection on the target polygon to obtain each feature point of the target polygon; and tracking each feature point of the target polygon in the first subsequent image frame sequence according to a first feature point position of each feature point of the target polygon in the first image frame;

wherein the calculating the target homography matrix according to the second vertex position and the third vertex position comprises:

in a case that the number of the tracked vertex is greater than or equal to a preset number threshold, calculating the target homography matrix according to the second vertex position and the third vertex position; and in a case that the number of the tracked vertex is less than the preset number threshold, calculating the target homography matrix according to the second vertex position, the third vertex position, a second feature point position of a tracked feature point of the target polygon in the second image frame in the second image frame and a third feature point position of each feature point of the target polygon in the previous image frame of the second image frame.

6. The method according to claim 1, further comprising:

in a case of determining that the target polygon is not tracked in a third image frame of the first subsequent image frame sequence, performing target detection for the target polygon on a second subsequent image frame sequence after and adjacent to the third image frame to determine a fourth image frame in which the target polygon first appears; and acquiring a fourth vertex position of each vertex of the target polygon in the fourth image frame.

7. The method according to claim 6, wherein the determining that the target polygon is not tracked in the third image frame of the first subsequent image frame sequence comprises:

upon detecting that each vertex of the target polygon is not tracked in the third image frame, determining that the target polygon is not tracked in the third image frame.

8. The method according to claim 6, wherein the performing the target detection for the target polygon on the second subsequent image frame sequence after and adjacent to the third image frame to determine the fourth image frame in which the target polygon first appears comprises:

performing polygon detection in the second subsequent image frame sequence to determine a fifth image frame in which a polygon to be matched first appears, wherein a shape of the polygon to be matched and a shape of the target polygon are identical;

calculating a similarity between the polygon to be matched and the target polygon; and in a case that the similarity is greater than or equal to a preset threshold, determining the fifth image frame as the fourth image frame.

9. The method according to claim 8, wherein after the performing the polygon detection on the first image frame to obtain each vertex of the target polygon, the method further comprises:

acquiring an initial image of the target polygon in the first image frame;

wherein the calculating the similarity between the polygon to be matched and the target polygon comprises:

acquiring an image to be matched of the polygon to be matched in the fifth image frame; and performing similarity calculation on the initial image and the image to be matched to obtain the similarity.

10. The method according to claim 8, wherein the acquiring the fourth vertex position of each vertex of the target polygon in the fourth image comprises:

in a case that there are at least two polygons to be matched in the fourth image frame whose similarity with the target polygon is greater than or equal to the preset threshold, determining a position of each vertex of a polygon to be matched with the largest size in the at least two polygons to be matched in the fourth image frame as the fourth vertex position.

11. The method according to claim 1, wherein the first image frame comprises an image frame in which the target polygon first appears in the target video.

12. The method according to claim 1, wherein the tracking each vertex of the target polygon in the first subsequent image frame sequence according to the first vertex position of each vertex of the target polygon in the first image comprises:

tracking each vertex of the target polygon in the first subsequent image frame sequence according to the first vertex position based on an optical flow algorithm.

13. The method according to claim 12, further comprising:

performing feature point detection on the target polygon to obtain each feature point of the target polygon; and tracking each feature point of the target polygon in the first subsequent image frame sequence according to a first feature point position of each feature point of the target polygon in the first image frame based on the optical flow algorithm.

14. A target tracking apparatus, comprising:

a processor; and memory, configured to store executable instructions;

wherein the processor is configured to read the executable instructions from the memory and execute the executable instructions to:

acquire a target video, wherein the target video comprises a first image frame and a first subsequent image frame sequence after and adjacent to the first image frame;

perform polygon detection on the first image frame to obtain each vertex of a target polygon;

track each vertex of the target polygon in the first subsequent image frame sequence according to a first vertex position of each vertex of the target polygon in the first image frame, to determine a position of a tracking target corresponding to the target polygon in the first subsequent image frame sequence; and in a case of determining that the target polygon has an untracked vertex in a second image frame of the first subsequent image frame sequence, relocate the untracked vertex according to a second vertex position of a tracked vertex of the target polygon in the second image frame in the second image frame and a third vertex position of each vertex of the target polygon in a previous image frame of the second image frame to obtain a relocated vertex position of the untracked vertex in the second image frame.

15. A non-transitory computer-readable storage medium, wherein the computer-readable storage medium stores a computer program, and when a processor executes the computer program, the processor is caused to:

acquire a target video, wherein the target video comprises a first image frame and a first subsequent image frame sequence after and adjacent to the first image frame;

perform polygon detection on the first image frame to obtain each vertex of a target polygon;

track each vertex of the target polygon in the first subsequent image frame sequence according to a first vertex position of each vertex of the target polygon in the first image frame, to determine a position of a tracking target corresponding to the target polygon in the first subsequent image frame sequence; and in a case of determining that the target polygon has an untracked vertex in a second image frame of the first subsequent image frame sequence, relocate the untracked vertex according to a second vertex position of a tracked vertex of the target polygon in the second image frame in the second image frame and a third vertex position of each vertex of the target polygon in a previous image frame of the second image frame to obtain a relocated vertex position of the untracked vertex in the second image frame.

16. The target tracking apparatus according to claim 14, wherein the processor is further configured to:

in a case that the target polygon has a vertex that is failed to be tracked in the second image frame or the target polygon has a vertex that has been moved out of the second image frame in the second image frame, determine that the target polygon has the untracked vertex in the second image frame.

17. The target tracking apparatus according to claim 14, wherein the processor is further configured to:

upon detecting that a number of the tracked vertex is less than the total number of vertices of the target polygon, determine that the target polygon has the untracked vertex in the second image frame.

18. The target tracking apparatus according to claim 14, wherein the processor is further configured to:

calculate a target homography matrix according to the second vertex position and the third vertex position; and perform homography transformation on a vertex position of the untracked vertex in the previous image frame of the second image frame by using the target homography matrix, to obtain the relocated vertex position.

* * * * *